United States Patent [19]

Libby et al.

[11] 4,116,562

[45] Sep. 26, 1978

[54] OPTICAL SYSTEM FEATURING CHANGE IN MAGNIFICATION BY COMBINED LENS AND MIRROR MOTION

[75] Inventors: Edwin L. Libby, Longmont; Myrl J. Miller, Boulder, both of Colo.

[73] Assignee: International Business Machines, Armonk, N.Y.

[21] Appl. No.: 608,941

[22] Filed: Aug. 29, 1975

Related U.S. Application Data

[63] Continuation of Ser. No. 301,681, Oct. 27, 1972, abandoned, which is a continuation of Ser. No. 87,508, Nov. 6, 1970, abandoned.

[51] Int. Cl.$^2$ ...................... G03B 27/70; G03G 15/26

[52] U.S. Cl. .................................... 355/60; 355/3 R; 355/57

[58] Field of Search ..................... 355/56, 57, 58, 59, 355/8, 65, 66, 27, 60, 55, 3 R

[56] References Cited

U.S. PATENT DOCUMENTS

| | | | |
|---|---|---|---|
| 2,772,599 | 12/1956 | Broms | 355/62 |
| 3,388,644 | 6/1968 | Granzow et al. | |
| 3,395,610 | 8/1968 | Evans et al. | 355/28 |
| 3,437,410 | 4/1969 | Tregay et al. | 355/57 |
| 3,486,819 | 12/1969 | Giulio | 355/8 X |
| 3,542,467 | 11/1970 | Ferguson | 355/8 |
| 3,556,655 | 1/1971 | Lux et al. | 355/51 X |
| 3,572,924 | 3/1971 | Matsumoto | 355/57 X |
| 3,614,222 | 10/1971 | Post et al. | 355/8 |
| 3,685,894 | 8/1972 | Lux et al. | 355/8 X |
| 3,703,334 | 11/1972 | Knechtel et al. | 355/57 X |
| 3,709,603 | 1/1973 | Furiuchi | 355/57 X |
| 3,711,199 | 1/1973 | Korzumi | 355/60 X |
| 3,792,926 | 2/1974 | Knechtel | 355/60 X |

FOREIGN PATENT DOCUMENTS

| | | | |
|---|---|---|---|
| 1,397,656 | 3/1965 | France. | |
| 1,015,142 | 1/1965 | United Kingdom | 355/57 |

*Primary Examiner*—L. T. Hix

*Attorney, Agent, or Firm*—Charles E. Rohrer; D. Kendall Cooper

[57] ABSTRACT

The optical system disclosed is incorporated in a copying machine and has provision for changing magnification of original documents of diverse sizes while maintaining a common image plane projection and enabling the use of common reference edges at a selected reference corner for any original document that might be used and also maintains common reference edges in the image plane. The system contemplates the combined movement of the lens element as well as one of a pair of mirrors to insure that the original document surface and the image plane remain in their fixed positions, regardless of the magnification factor chosen. The lens element is movable forwardly and reversely along the optical path as well as transversely with respect thereto.

16 Claims, 9 Drawing Figures

| DOCUMEN | IMAGE | MAGNIFICATION |
|---|---|---|
| 8.5X14 | 8.67X14.28 | 1.02 |
| 11.75X17 | 7.755X11.22 | .66 |

OPTICAL SYSTEM FEATURING CHANGE IN MAGNIFICATION BY COMBINED LENS AND MIRROR MOTION

This is a continuation of application Ser. No. 301,681 filed Nov. 27, 1972, now abandoned, which is a continuation of Ser. No. 87,508, filed Nov. 6, 1970, now abandoned.

BACKGROUND OF INVENTION AND PRIOR ART

The following U.S. patents are representative of the prior art: U.S. Pat. Nos. 2,431,612; 3,237,516; 2,821,882; 3,329,029; 2,923,503; 3,437,410; 2,940,358; 3,476,478.

While the majority of the patents listed above are directed to the capability of changing magnification in an optical system, none of the patents is believed anticipatory to the arrangement set forth herein for maintaining a constant document plane location and image plane location without using auxiliary lens elements and further using common reference edges on both planes for different size documents.

SUMMARY OF THE INVENTION

The present invention is set, in a high speed copier environment producing on the order, and as an example, 125 copies per minute. The high speed copying system has the customary electrophotographic facilities, particularly including a photoconductor medium, such as a belt, and having an image plane toward which images of original documents are projected by the optical system. The system used in the copier machine is what is commonly known as a folded optical system, meaning that light from the original is reflected toward one or more reflecting surfaces that change the direction of the light path and that permit a more compact arrangement of elements.

In typical copying work, documents may range in size, as an example, from 8.5 × 11 inches to 11 × 17 inches. An intermediate size of 8.5 × 14 inches may also be accommodated. For ease of operation, it is desirable that the system permit placement of the original documents in a convenient fashion. This is permitted in the present system by establishing a longitudinal reference edge and a lateral or transverse reference edge as locating edges for placement of original documents. These edges remain fixed regardless of the document size placed on the machine for imaging, thereby facilitating operations. It is customary that the photoconductor medium, such as a belt, be positioned in the machine for movement past an image station, the image station remaining fixed in the machine. In accordance with other aspects of the invention, provision is made for projecting images derived from original documents, regardless of their size (within the constraints of the particular machine implementing this invention), onto the same effective image area on the photoconductor medium. In a typical case, this may contemplate an image area of 8.5 × 14 inches. Thus, regardless of the size of the original document, the image derived therefrom is projected into essentially the same image area on the photoconductor belt. This arrangement offers advantages such as simplified copy paper feed, constant image-to-developer time, and constant reference edges for random size, automaticaly fed documents.

In order to effect a change in magnification, whether going from a larger image to a smaller image, or vice versa, facilities are provided in the system for moving the lens element along the optical path from a first position to a second position and return. With a simple lens, as opposed to a zoom lens, such a movement requires a change in total conjugate length. This change is performed in the present system by the inclusion of a mirror reflecting element that is movable from a first location to a second location in synchronism with movement of the lens element. To insure the projection of the image into the desired image plane area on the photoconductor medium, the lens element is further translated in a transverse direction with respect to the optical path, thereby insuring that the images transmitted from the original document plane are accurately aligned with respect to the original document as well as the image plane on the photoconductor element.

OBJECTS

Accordingly, a primary object of the present invention is to provide an optical system with facilities for changing magnification of images projected therein from a larger size to a smaller size, and vice versa.

Still another object of the present invention is to provide an optical system that incorporates movable elements such as a lens and at least a mirror movable in a manner to change the magnification of images projected therein and enabling the placement of original documents against common reference edges regardless of size.

A further object of the present invention is to provide an optical system, particularly useful in an electrophotographic environment, for projecting images of original documents of diverse sizes to a common image plane area on a photoconductor medium with consequent reduction or magnification, as required, to insure the accommodation of the image in the image area.

A further object of the present invention is to provide an optical system for changing magnification of images projected therein and projecting images toward a common image plane with provision for movement of a lens element both longitudinally along an optical path as well as transversely with respect thereto.

Also, an object of the invention is to provide a folded optical system including a lens element and at least a first mirror reflecting means with a combined motion of the lens and mirror to effect a change in magnification, meanwhile enabling the placement of original documents of various sizes against the same common reference edges.

The foregoing and other objects, features, and advantages of the invention will be apparent from the following more particular description of the preferred embodiment of the invention as illustrated in the accompanying drawings.

DRAWINGS

In the drawings:

FIG. 1 is a schematic diagram of a high speed copier system utilizing a photoconductive belt for the conveyance of images flashed thereon from an original document and conveyed by an optical system in accordance with the present invention.

FIGS. 2*a* and 2*b* illustrate some of the optical principles involved in making a change in magnification from 1.02 to 0.66 in a system of the nature of that shown in FIG. 1.

FIG. 6 also shows an edge shift to produce borders on a reduced image in an image area.

DETAILED DESCRIPTION

The High Speed Copier System

Figure 1:
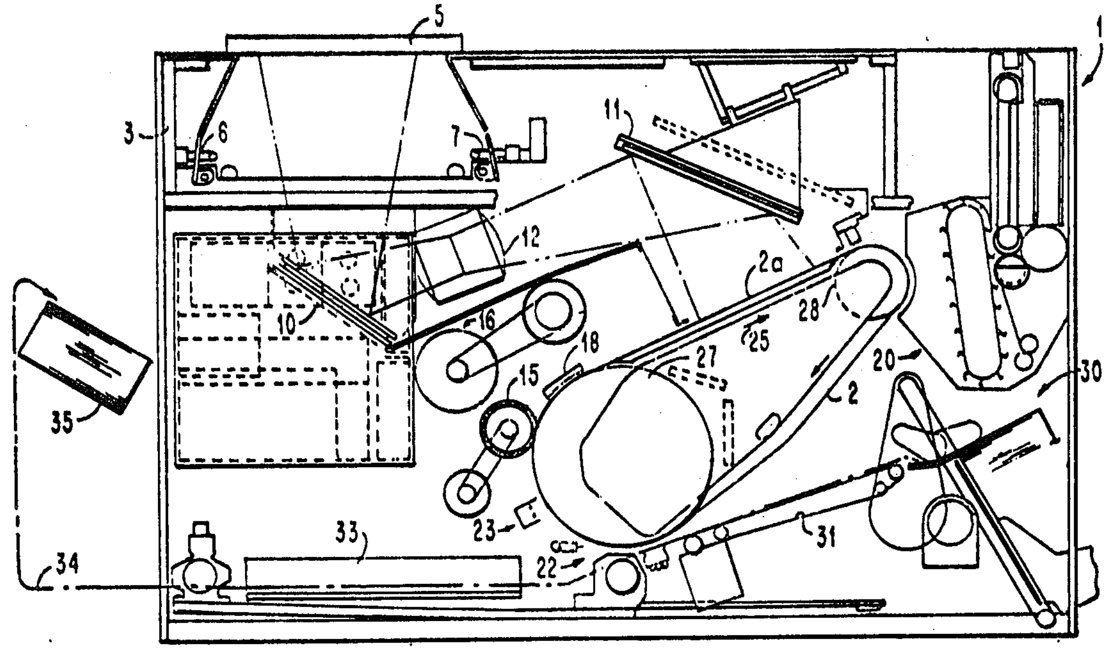

FIG. 1 illustrates a high speed copier unit 1 incorporating the present invention. The unit includes a photoconductor belt 2 and has a main frame 3 supporting various elements for producing a multitude of copies at high speeds from original documents. An original is positioned on a transparent plate in the stationary original document plane 5 and illuminated by flash lamps 6 and 7 in timed relation with movement of belt 2. An optical system including mirrors 10 and 11 and lens element 12 project the image of the original toward a stationary image plane 2*a* on moving belt 2.

The unit in FIG. 1 incorporates the customary electrophotographic facilities for producing copies. These include a cleaning brush 15 with associated cyclone cleaning system 16, a charge corona station 18, the image plane 2*a*, previously mentioned, a developer station 20, a transfer station 22, and a preclean corona station 23. Belt 2 is mounted for movement as indicated by arrow 25 on drum driving elements 27 and 28. A paper supply 30 accommodates a large quantity of individual sheets of paper that are fed by various devices including a belt 31 to the transfer station 22 for transfer of images in timed relation with movement of belt 2. Following such transfer, the image is fused by fuser 33, passes by transportation means 34, not shown, to a completion station, such as a sorter copy bin 35.

CHANGE IN CONJUGATE LENGTH DUE TO LENS MOVEMENT

Figure 2A:
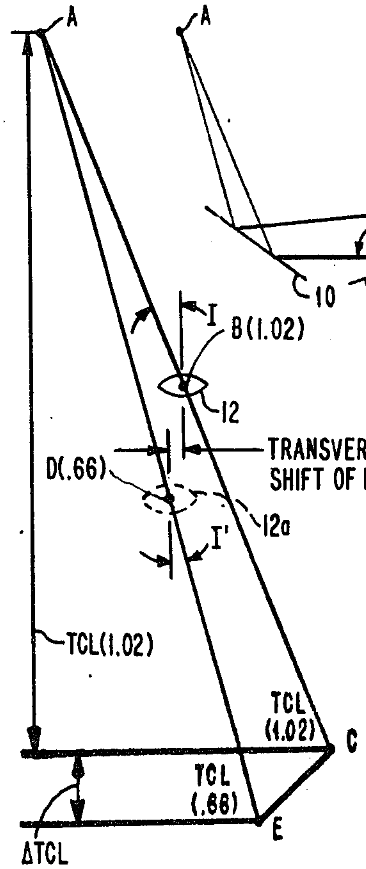
Figure 2B:
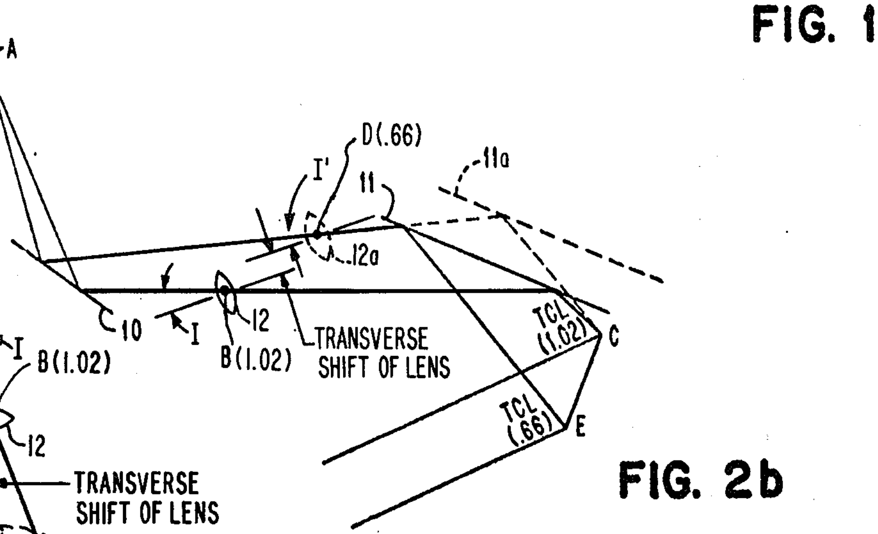

FIGS. 2*a* and 2*b* represent unfolded and folded optical systems, respectively, illustrating certain of the parameters that need to be taken into account when motion is imparted to a lens element in the systems. In FIG. 2*a*, point A represents the location of a corner referenced original document, point B represents the location of the lens element with a magnification factor of 1.02, and point C is the location of the image of point A at the total conjugate length (TCL) for this 1.02 magnification. Movement of the lens from point B to point D effects a change in magnification to 0.66 but also requires that there be an increase in the total conjugate length in comparison with the original total conjugate length so that image focal sharpness is maintained. It is important to note that point E, the image of point A at 0.66 magnification, does not coincide with point C, the image of point A at 1.02 magnification. In fact, the change in TCL has resulted in a shift of the entire image plane which raises a serious problem for electrophotographic machines such as shown in FIG. 1 where the document plane 5 containing point A and the image plane 2*a* are both stationary. This change in TCL is remedied in FIG. 2*a*, explained below.

Note also that FIG. 2*a* shows a transverse shift in the position of the lens as well as a shift in the magnification dimension. The purpose of that transverse shift is to align in the image plane one of the reference edges forming the corner defining points C and E. A second transverse dimension of lens movement is necessary for aligning in the image plane the other reference edge defining points C and E but is not shown in the two-dimensional drawings of FIGS. 2*a* and 2*b*.

FIG. 2*b* provides a solution for the problem of making the image plane for 0.66 magnification coincident with the image plane at 1.02 magnification by providing a folded optical version of the relationships just described in connection with FIG. 2*a*. Points A, B, C, D, and E are essentially the same as those shown in FIG. 2*a*. The configuration shows mirror 10 held stationary and mirror 11 movable from the solid line to the dashed line position to convey the images during operation of the system. The combined movements of the lens element from position B to D, and the mirror 11 from the solid line to the dashed line position provides for the change in the total conjugate length the required distance and (together with the two axes of transverse shift of the lens) makes possible the coincidence of point E and point C. That is, the light image continues on from lens 12 at point D along the dashed path for reflection from mirror 11 in the dashed position so tht the image arrives at and becomes exactly coincident with point C rather than its original solid line travel and arrival at the non-coincident point E illustrated. This maintains the image location in a constant position, at Point C irrespective of whether a 1.02 or 0.66 magnification factor exists. If mirror 11 were to remain in the solid line position shown in FIG. 2*b*, then the image would be projected from lens 12*a* at position D to point E rather than to point C. It is desirable that the image be projected to point C regardless of whether a magnification ratio of 1.02 or 0.66 is used. As is known in the art, the total conjugate length comprises the first conjugate, that is, the distance from the object plane to the lens plus the second conjugate, that is, the distance from the lens to the image plane.

TYPICAL ORIGINAL DOCUMENTS, LENS MOVEMENT, AND IMAGE PLANE

Figure 3:
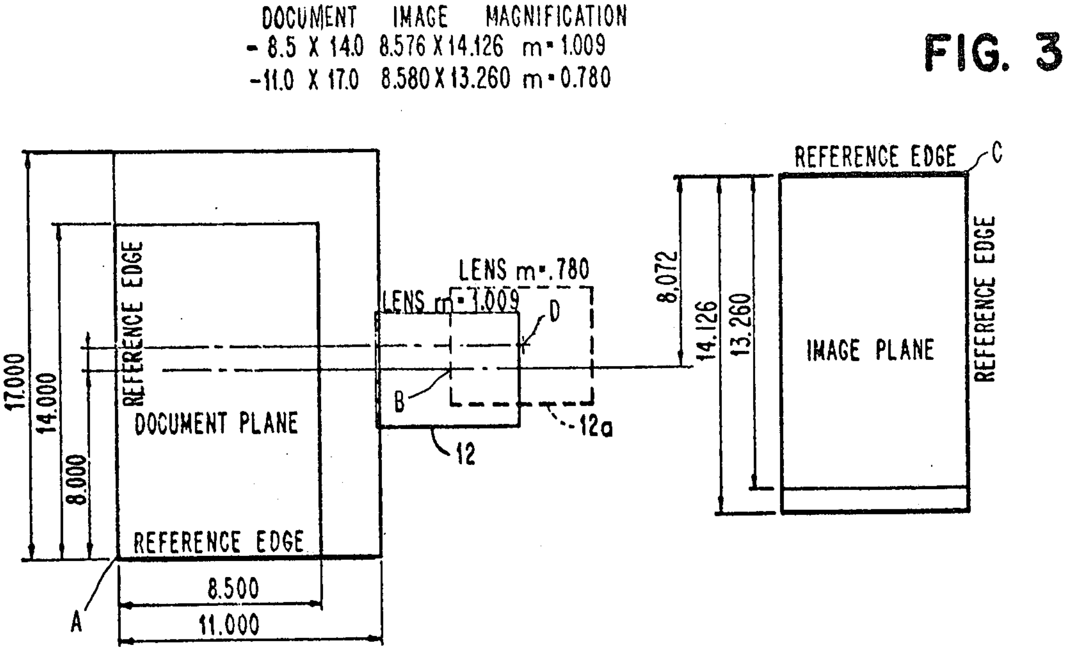
FIG. 3 illustrates the relationships of the original documents placed against common reference edges to the ultimate image plane on the photoconductor belt in the system of FIG. 1 together with lens motion where the magnification ratios are 1.009 and 0.78.
Figure 4:
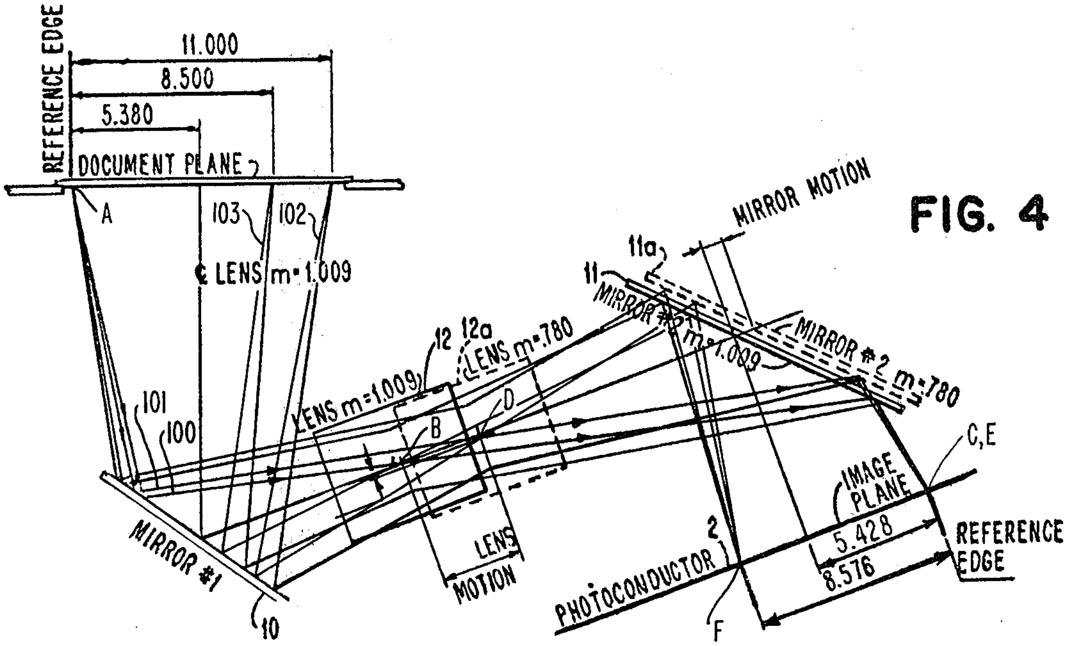
FIG. 4 is a more detailed rendering of the optical system incorporated in the system of FIG. 1, once again illustrating magnification ratios of 1.009 and 0.78.

FIG. 3 illustrates typical original document sizes of 8.5 × 14 inches and 11 × 17 inches, each such document being positioned against two reference edges forming an angle or reference corner on the top surface of the copy machine shown in FIG. 1. FIG. 3 is intended to be diagrammatic of the actions involved. FIG. 4 is somewhat more detailed, and FIGS. 5–9 illustrate structures of a typical embodiment. Referring again to FIGS. 3 and 4, reference edges A and C are simply extensions respectively, of points A and C in FIG. 2*b*. Lens element 12 is movable from the solid line position with a magnification factor of 1.009 to the dashed line position indicated at 12*a* with a magnification factor of 0.780. These are slightly different ratios than the 1.02 and 0.66 ratios discussed in connection with FIGS. 2*a* and 2*b* but the underlying principles are the same. As shown in FIG. 3, the image is maintained in a constant relationship with respect to the photoconductor belt, the two reference edges on the image plane representation corresponding respectively to their counterparts in the document plane portion of FIG. 3. The net effect of the arrangement is such that all documents from the smallest to the largest size will be referenced in an identical corner on the image plane. It is obvious that the fact that the reference corner on the image plane is maintained does not imply that it always falls on the same physical spot on the moving photoconductor belt.

As will be clarified in later sections, as lens element 12 is moved from the solid line position to the dashed line position illustrated in FIG. 3 along the optical path, it is also moved transversely with respect to the optical path to project the images of the original documents properly even though their centers are displaced from one another due to variance in their dimensions.

LENS AND MIRROR RELATIONSHIPS

FIG. 4 illustrates the relationships of the lens and mirrors under various conditions of operation and takes into account the facilities for changing magnification. Points A, B, C, and D correspond to similarly designated points in FIG. *2b*. One of the reference edges is illustrated for the original document and three transverse dimensions of 5.380, 8.500, and 11.000 inches are shown. Lens 12 is moved from point B to point D, and conversely, in a range of magnification from 1.009 to 0.780. Coupled with the lens movement is movement of the mirror 11 to position 11*a*, and conversely, in a corresponding range to properly convey the images from lens 12 to the image plane and corresponding to the magnification values at 1.009 and 0.780. Light ray 100 is shown emanating from point A on the document plane and after reflection by mirror 10, it passes through the center of lens 12 at 1.009 magnification (which is point B) to mirror 11, whereupon it is reflected to the image plane at point C. Light ray 101 also emanates from point A and passes through the center of lens 12 at 0.780 magnification (which is point D) to the mirror at position 11*a*, whereupon it is reflected to the image plane at point C. Thus, point A is imaged at point C regardless of the magnification ratio.

The lens is also shown moved in FIG. 4 in a direction transverse to the optical axis. Again, as in FIGS. *2a* and *2b*, if the reference corner represented by the intersection of two reference edges at point C is to be maintained at different magnification ratios, another transverse movement must be made, not shown in the two-dimensional drawing of FIG. 4.

It is noteworthy to observe that light ray 102 emanating from the edge of the 11-inch document width on the document plane passes through the optical system at 0.078 magnification to arrive at the image plane at point F, thus defining an image width of 8.58 inches. This is essentially the same width as the 8.576 inches shown on FIG. 4 for image width obtained from the edge of the 8.5 document width, light ray 103, at 1.009 magnification.

LENS AND MIRROR STRUCTURE

Figure 5:
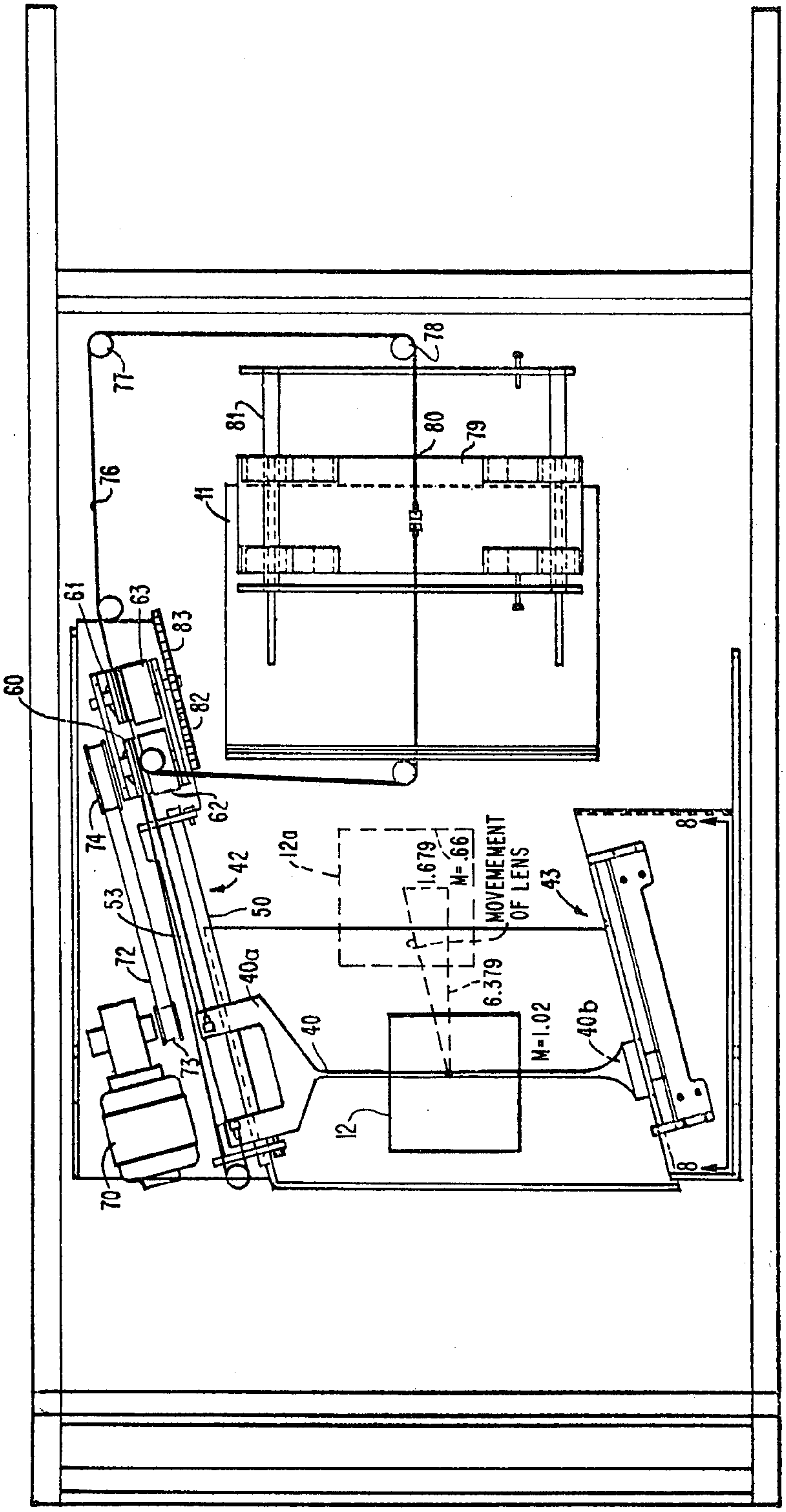
FIG. 5 is a top elevation of various components included in the optical system shown in FIG. 4 except that magnification ratios of 1.02 and 0.66 are shown.
Figure 6:
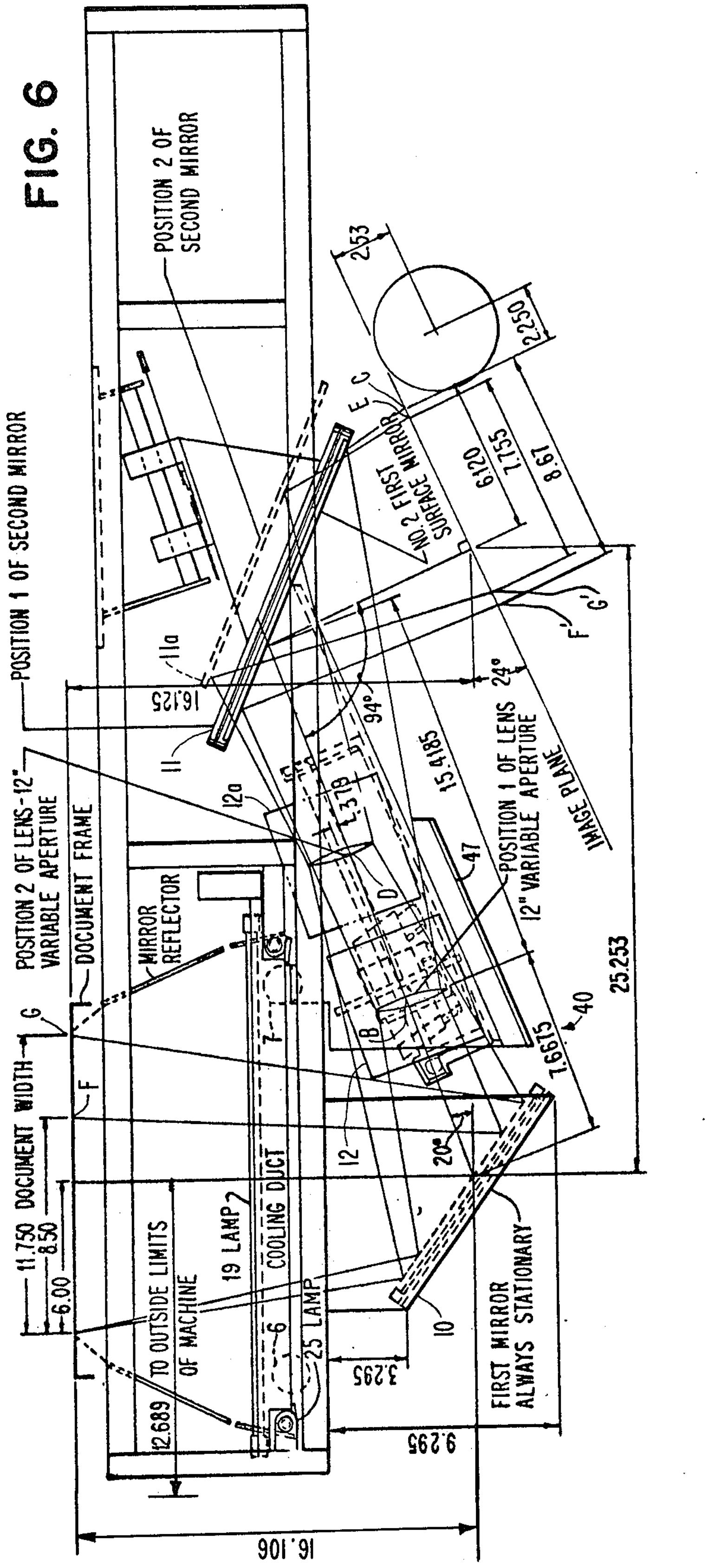
FIG. 6 shows a side elevational view of the optical components of the machine at magnification ratios of 1.02 and 0.66.
Figure 7:
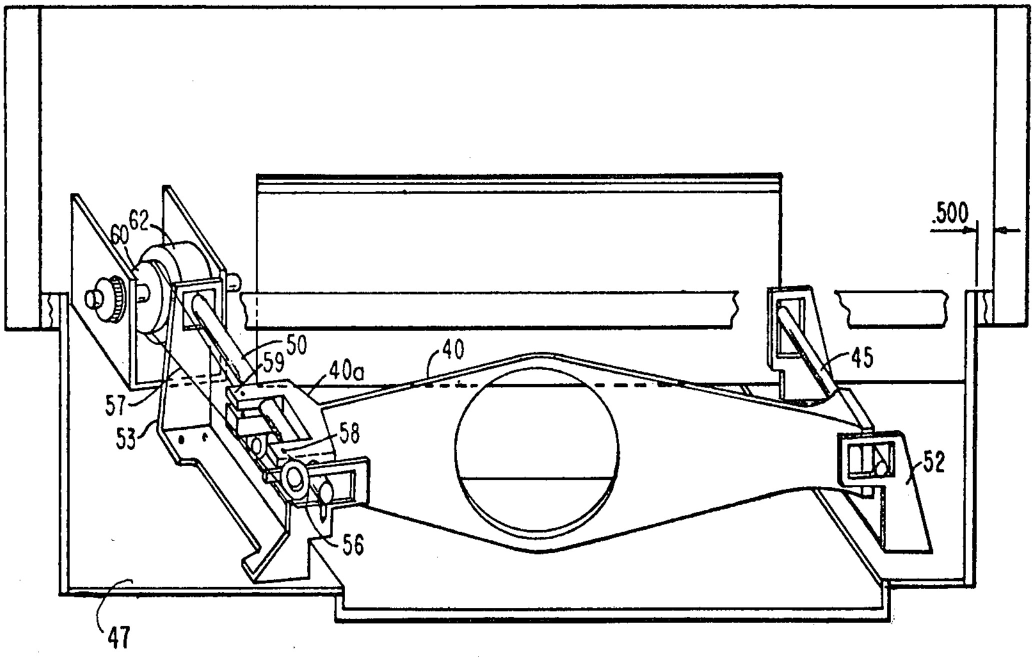
FIG. 7 shows some of the lens transporting structure of FIG. 5 in greater detail.
Figure 8:
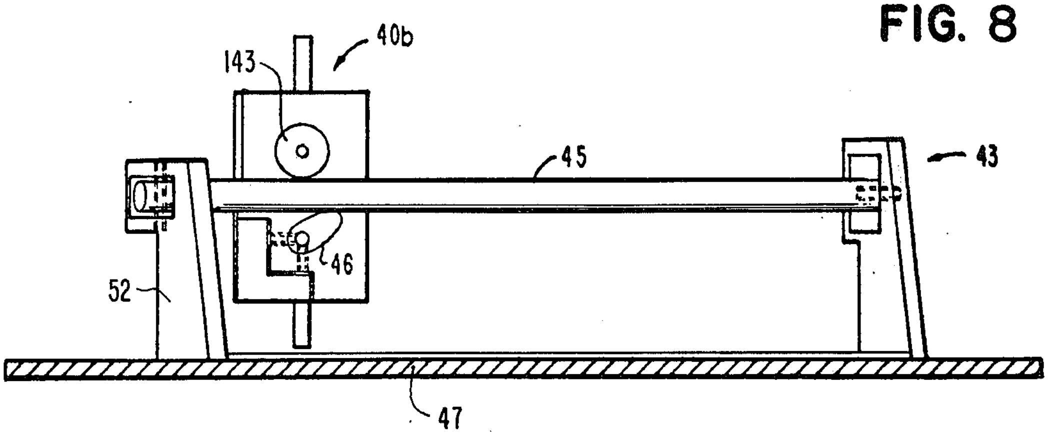
FIG. 8 is an end elevation of guide rails taken on the line 8—8 in FIG. 5.

FIGS. 5–8 illustrate various structural considerations of the optical system according to the present invention. FIG. 5 is a top elevation of the optical system illustrating the translational movement of lens element 12 in a horizontal plane transversely with respect to the optical path during a change in magnification ratio. Portions of the hardware are also shown in FIGS. 6–8. Typical original document widths of 8.5 and 11 inches are shown in FIG. 4, together with 5.38 inches which is the dimension from the reference edge to the optical axis at 1.009 magnification, while other original document widths (also typical) of 8.5 and 11.75 are illustrated in FIG. 6, together with 6 inches which is the dimension from the reference edge to the optical axis at 1.02 magnification.

The structures shown facilitate the change in magnification of the system from one extreme to another. As may be observed, movement of the lens element from one position where the lens element is designated 12 to the other position 12*a* and movement of the movable mirror from the position where it is designated 11 to the position 11*a* corresponds to the related movement shown in FIG. *2b* and also is termed movement from "Position 1 to Position 2. The converse movement of lens 12 and mirror 11 also can be related to FIG. *2b* and is termed movement from Position 2 to Position 1. Position 1 of the elements is used, as an example, during imaging of an 8.5 × 14.0 inch original document with a magnification ratio of 1.009, while Position 2 of the elements is used, as another example, during imaging of an 11.0 × 17.0 inch original document with a magnification ratio of 0.780, as shown in FIG. 3.

As may be seen in FIG. 5, lens 12 is mounted in a lens supporting means 40 having end portions 40*a* and 40*b* supported for movement by guide assemblies 42 and 43. Guide assembly 43 is shown particularly in FIG. 8 where it is shown that a thoroughly stable support is given to lens element 12 by a three point mounting of supporting member 40 comprising the U-shaped bracket portion 40*a* (two points) and the single supporting portion 40*b*. Typical of the supporting portions 40*a* and 40*b* is portion 40*b* carrying a roller element 143 that is movable along guide rod 45. A predetermined clearance to enable a snug fit of roller 143 against guide rod 45 is obtained by eccentric 46 that is adjusted to enable free movement with very slight clearance. This maintains integrity of the elements during magnification change of the system. As can be seen in FIG. 6, the lens support member 40 is further positioned at an angle with respect to the horizontal by a plate 47, thereby insuring that as lens 12 moves from its first position with 1.02 magnification to its second position of 0.66 magnification, it is also moved upwardly essentially along the optical path but with some slight displacement which, as indicated, is 0.379 inches. This slight shift of the original optical axis relocates the image, thus insuring that the reduced image remains within the full-size image area. Common image reference edges, or one common image reference edge, may be maintained as they are in FIGS. 3 and 4 where points C and E were made to coincide, but FIG. 6 shows that the reduced image at 0.66 magnification can be located in the image area with some displacement relative to the prior image produced at the 1.02 magnification. In FIG. 6, the maximum size document, 11.75 inches, defined by points A and G on the document plane, results in an image width of only 7.755 inches, defined by points E and G′, on the image plane at 0.66 magnification. This is in contrast to the 8.67 image width defined by points C and F′ produced at 1.02 magnification from the 8.5-inch wide document defined at the document plane by points A and F. Thus, it is possible to shift the edges of the reduced image (7.755 inches) in the 8.67-inch image area. The image edge shift is obtained by shifting the lens a vertical distance of 0.379 inches as shown in FIG. 6.

FIG. 7 shows guide rail 45, previously referred to, and the opposite guide rail 50 that supports the U-shaped portion 40*a* of lens support member 40. Guide rod 45 is supported by bracket member 52 and guide rod 50 is supported by bracket member 53. Bracket member 53 further supports a pulley member 56 carrying a cable 57 which is attached at one end to a pin 58 on portion 40*a* of support member 40. The opposite end of cable 57 is attached at 59 to the other part of the U-shaped portion 40*a*. Cable 57 passes over a driving drum 60 forming part of a slip clutch 62 that can also be seen in FIG. 5.

The primary source of driving for the magnification structures is motor 70 coupled by drive belt 72 and pulleys 73 and 74 to slip clutch 62 and a second slip clutch 63 that serves to drive the mirror moving elements as may best be seen in FIG. 5. A cable 76 is coupled by pulleys 77 and 78 to a mirror supporting member 79 at point 80. Gear elements 82 and 83 are engaged to transmit driving force from the drive shaft of pulley 74 to slip clutch 63.

Since a common drive motor 70 is coupled to slip clutches 60 and 61, a combined movement of lens 12 as well as mirror 11 occurs whenever a change in magnification is required either from a larger size to a smaller size, or vice versa.

In operation, whenever a change in position of the lens element 12 and mirror 11 are required, motor 70 is energized, driving slip clutches 60 and 63 for two or three seconds. Driving by motor 70 of slip clutches 60 and 65 continues until such time as lens supporting member 40 reaches the stops at either end of the supporting brackets 52 and 53 at which time slippage occurs in the clutch 60 and until mirror supporting member 79 in a comparable manner reaches its stops on supporting bracket 81. The driving of the lens and mirror are preferably arranged to occur concurrently but may be arranged so that they are accomplished in sequence, that is, the lens is first driven to its stop locations and then the mirror is driven to its stop locations.

It may thus be seen that a convenient arrangement is provided for changing magnification in a system of this nature while maintaining integrity of the image conveyed to the image plane, accommodating original documents of various sizes, and enabling the use of common reference edges for alignment of both original documents and their images.

While the invention has been particularly shown and described with reference to a preferred embodiment, it will be understood by those skilled in the art that various changes in form and detail may be made without departing from the spirit and scope of the invention.

What is claimed is:

1. A copier system incorporating at least a lens element and a reflector member and enabling the positioning on a document plane of documents within a predetermined size range from largest to smallest at a reference corner established by the intersection of two preselected intersecting reference edges of said documents positioned in said document plane, providing for at least one magnification mode change for projection of images of said documents from said document plane to an image plane, and maintaining a common reference corner in said image plane for images projected, comprising:

lens supporting means for supporting said lens element for movement substantially along the optical path of images transmitted in said system, the range of movement of said lens element being between at least a first position and a second position to thereby effect change in magnification of images projected in said system, said supporting means being further arranged to concurrently impart a movement of said lens element transversely with respect to said optical bath as it moves between said first position and said second position, the extent of transverse movement of said lens element being of sufficient range to insure projection of images in said system in a constant relationship with respect to said image plane common reference corner for all documents of largest to smallest size;

first driving means for moving said lens supporting means and said lens element on a selective basis as required between said first and second positions during operation of said system;

reflector supporting means supporting said reflector member in working relation in the optical path established in said system, said reflector supporting means being movable between first and second positions in conjunction with changes in magnification of images transmitted in said system; and second driving means operable to drive said reflector supporting means and said reflector member concurrently with driving of said lens supporting means and said lens element by said first driving means.

2. The system of claim 1, further comprising:

at least a pair of referencing means forming a corner against which documents abut, regardless of size variances among said documents.

3. The system of claim 2 wherein the predetermined size range is from 6 × 9 inches to 11 × 17 inches.

4. The system of claim 1, wherein said optical system is a "folded" system incorporating said lens element, said movable reflector member, and a second reflector member, and further comprising:

means supporting said second reflector member in a relatively stationary location to reflect light images in said system during operation.

5. The system of claim 1, wherein said first driving means comprises:

a primary motive means for providing driving force for use during changes in magnification in said system; and interconnecting means interconnecting said primary motive means with said lens supporting means, said interconnecting means incorporating a slip clutch and cable and pulley drive means to enable the driving of said lens supporting means and said lens element backwardly and forwardly between positions, as required.

6. The system of claim 5, further comprising:

reflector supporting means mounting said reflector member for movement between first and second positions; and reflector drive means interconnecting said primary motive means to said reflector supporting means in driving relation, said reflector drive means incorporating a second slip clutch and cables and pulleys arranged to enable the reciprocatory movement of said reflector means from one position to another, as required.

7. The system of claim 5, further comprising:

guide means arranged in guiding relationship with respect to said lens supporting member, said guide means being arranged to guide said lens supporting means in a path that has both a component of motion along the optical path of said system and two components of motion transverse with respect to said optical path.

8. The system of claim 7, further comprising:

roller support means associated with said lens support means and arranged for engagement with said guide means to enable a rolling movement of said lens support member between its first and second conditions; and means for adjusting the degree of frictional engagment of said roller means with said guide means.

9. A copier system incorporating at least a lens element and having facilities enabling the positioning in a document plane of documents within a predetermined size range from larger to smaller at a reference corner established by the intersection of two preselected intersecting reference edges of said documents positioned in said document plane while providing for at least one magnification mode change for projection of images of said documents from said document plane to an image plane, and maintaining a common reference corner in said image plane for images projected, comprising:

lens supporting means for supporting said lens element for moving substantially along the optical path of images transmitted in said system, the range of movement of said lens element being between at least a first position and a second position to thereby effect change in magnification of images projected in said system, said supporting means being further arranged to impart a movement of said lens element transversely with respect to said optical path, the extent of transverse movement of said lens element being of sufficient range to insure projection of images in said system in a constant relationship with respect to said image plane common reference corner for all documents of larger to smaller size;

driving means for moving said lens supporting means and said lens element on a selective basis as required between said first and second positions during operation of said system;

a reflector member;

reflector supporting means supporting said reflector member in working relation in the optical path established in said system, said reflector supporting means being movable between first and second positions in conjunction with changes in magnification of images transmitted in said system; and additional driving means operable to drive said reflector supporting means and said reflector member between said first and second positions.

10. The system of claim 9, further comprising:

a document supporting plane for supporting documents for transmission of images during operation of said system, said document supporting plane incorporating referencing means forming a corner against which documents abut, regardless of size variances among said documents.

11. An electrophotographic copier system incorporating at least a lens element and having facilities for performing a sequence of copying operations wherein it is desired to make copies that differ in size from documents and enabling the positioning in a document plane of documents of a predetermined size range from larger to smaller at a reference corner established by the intersection of two preselected intersecting reference edges of said documents positioned in said document plane while providing for a magnification mode change for projection of images of said documents from said document plane to a photosensitive member in an image lane, and maintaining a common reference corner on said photosensitive member for images projected, comprising:

lens supporting means for supporting said lens element for movement substantially along the optical path of images transmitted in said system, the range of movement of said lens element being between at least a first position and a second position to thereby effect change in magnification of images projected onto said photosensitive member, said supporting means being further arranged to impart a movement of said lens element transversely in two axes with respect to said optical path, the extent of transverse movement of said lens element being of sufficient range to insure projection of images in said system in a constant relationship with respect to the common reference corner on said photosensitive member for all documents of larger to smaller size;

driving means for moving said lens supporting means and said lens element on a selective basis as required between said first and second positions during operation of said system;

a reflector member;

reflector supporting means supporting said reflector member in working relation in the optical path established in said system, said reflector supporting means being movable between said first and second positions in conjunction with a change in magnification of images transmitted in said system; and additional driving means operable to drive said reflector supporting means and said reflector member between said first and second positions.

12. An imaging system, comprising:

a single lens element;

document plane means having a document corner enabling the positioning of documents within a predetermined size range from larger to smaller at a reference corner established by the intersection of two preselected intersecting reference edges of said documents positioned in said document plane;

image plane magnification mode means providing for magnification change for projection of images of said documents from said document plane along an optical path to said image plane;

lens supporting means for supporting said lens element for movement substantially along the optical path of images transmitted in said system, the range of movement of said lens element being between at least a first position and a second position to thereby effect changes in magnification of images projected in said system, said supporting means being further arranged to impart a compound transverse movement of said lens element with respect to said optical path, the extent of transverse movement of said lens element being of sufficient range to insure projection of images in said system at a common reference corner in said image plane for images projected for all documents of larger to smaller size; and driving means for moving said lens supporting means and said lens element on a selective basis as required between said first and second positions during operation of said system.

13. An electrophotographic copying machine for copying documents at various discrete magnification ratios, said documents typically of various rectangular sizes comprising:

a transparent plate mounted on said maching for supporting said documents of various sizes in a stationary document plane, said documents located on said document plane by a common reference corner;

flash lamp means for illuminating said document plane, mounted adjacent to said transparent plate;

a photoconductive surface mounted in said machine;

power means operatively connected to said photoconductive surface for moving said surface in said machine;

an optical system including a mirror element and a lens member, mounted in said machine for projecting light received from the illuminated document plane to a stationary image plane on said photoconductive surface;

a lens supporting member mounted in said machine for movement to lens stop positions, said movement including a component along the optical path defined by the axis of the light directed from said document plane to said photoconductive surface and a component transverse to said optical path;

lens guide means mounted in said machine for supporting said lens supporting member to provide guideways for lens movement in three dimensions;

drive means operatively connected to said lens supporting means for moving said lens member along said lens guide means to said lens stop positions;

mirror supporting means mounted in said machine for movement to mirror stop positions to provide an appropriate adjustment to the total conjugate length of the optical path as lens position changes;

mirror guide means mounted in said machine for supporting said mirror supporting means to provide guideways for mirror movement; and motive means operatively connected to said mirror supporting means for moving said mirror member along said mirror guide means to said mirror stop positions;

whereby the sharpness of the focal image of said documents is maintained and the position of the image is maintained in a corner referenced position in the essentially same location on said image plane.

14. The machine of claim 13 wherein said motive means and said drive means include transmissions connected to the same power source.

15. The machine of claim 14 wherein said drive means includes a slip clutch.

16. The machine of claim 14 wherein said motive means includes a slip clutch.

* * * * *